(12) United States Patent
Surnilla et al.

(10) Patent No.: US 9,957,906 B2
(45) Date of Patent: May 1, 2018

(54) METHODS AND SYSTEMS FOR PCV FLOW ESTIMATION WITH AN INTAKE OXYGEN SENSOR

(71) Applicant: Ford Global Technologies, LLC, Dearborn, MI (US)

(72) Inventors: Gopichandra Surnilla, West Bloomfield, MI (US); James Alfred Hilditch, Canton, MI (US); Matthew John Gerhart, Dearborn Heights, MI (US); Lynn Aimee Chesney, Flat Rock, MI (US); Stephen B. Smith, Livonia, MI (US)

(73) Assignee: Ford Gloabl Technologies, LLC, Dearborn, MI (US)

( * ) Notice: Subject to any disclaimer, the term of this patent is extended or adjusted under 35 U.S.C. 154(b) by 1212 days.

(21) Appl. No.: 14/073,480

(22) Filed: Nov. 6, 2013

(65) Prior Publication Data

US 2015/0121864 A1    May 7, 2015

(51) Int. Cl.
*F02D 41/00* (2006.01)
*F02D 41/14* (2006.01)
(Continued)

(52) U.S. Cl.
CPC ....... *F02D 41/0052* (2013.01); *F02D 41/005* (2013.01); *F02D 41/0072* (2013.01);
(Continued)

(58) Field of Classification Search
CPC ............ F01M 13/00; F02D 2200/0418; F02D 2250/08; F02D 41/0007; F02D 41/0042;
(Continued)

(56) References Cited

U.S. PATENT DOCUMENTS 4,601,273 A   7/1986  Kitahara et al.
5,392,598 A   2/1995  White et al.
(Continued)

FOREIGN PATENT DOCUMENTS

EP    0005613 A2   11/1979
EP    0844380 B1    3/2003

OTHER PUBLICATIONS

Surnilla, Gopichandra et al., "Methods and Systems for Humidity Detection Via an Exhaust Gas Sensor," U.S. Appl. No. 13/745,639, filed Jan. 18, 2013, 32 pages.
(Continued)

*Primary Examiner* — Mark Laurenzi
*Assistant Examiner* — Paul Thiede
(74) *Attorney, Agent, or Firm* — Julia Voutyras; McCoy Russell LLP (57) ABSTRACT

Methods and systems are provided for estimating a positive crankcase ventilation (PCV) flow based on outputs of an intake manifold oxygen sensor. For example, during engine operation when exhaust gas recirculation (EGR) and fuel canister purge are disabled, PCV flow may be estimated based on a difference between a first output of the sensor with boost enabled and a second output of the sensor with boost disabled. Then, during subsequent operation wherein EGR is enabled, PCV flow is enabled, and purge is disabled, a third output of the sensor may be adjusted based on the estimated PCV flow.

12 Claims, 6 Drawing Sheets

(51) Int. Cl.
*F01M 13/00* (2006.01)
*F02M 25/08* (2006.01)
*F02M 26/02* (2016.01)
*F02M 26/00* (2016.01)

(52) U.S. Cl.
CPC ....... *F02D 41/144* (2013.01); *F02M 25/0872* (2013.01); *F02M 26/02* (2016.02); *F01M 13/00* (2013.01); *F02D 41/0007* (2013.01); *F02D 41/0042* (2013.01); *F02D 2200/0418* (2013.01); *F02D 2250/08* (2013.01); *F02M 2026/001* (2016.02); *Y02T 10/47* (2013.01)

(58) Field of Classification Search
CPC ............... F02D 41/005; F02D 41/0052; F02D 41/0072; F02D 41/144; F02M 2026/001; F02M 25/0872; F02M 26/02; Y02T 10/47
USPC .......................................... 60/605.2; 123/516
See application file for complete search history.

(56) References Cited

U.S. PATENT DOCUMENTS

| | | |
|---|---|---|
| 6,182,498 B1 | 2/2001 | Mizutani et al. |
| 6,739,177 B2 | 5/2004 | Sato et al. |
| 6,742,379 B2 | 6/2004 | Matsubara et al. |
| 7,886,727 B2 * | 2/2011 | Ulrey .................. F02D 9/12 123/516 |
| 8,392,098 B2 | 3/2013 | Yamashita |
| 8,522,760 B2 | 9/2013 | Soltis |

OTHER PUBLICATIONS

Surnilla, Gopichandra et al., "Intake Air Oxygen Compensation for EGR," U.S. Appl. No. 13/789,182, filed Mar. 7, 2013, 32 pages.

Pursifull, Ross Dykstra, "Methods and Systems for an Oxygen Sensor," U.S. Appl. No. 13/849,402, filed Mar. 22, 2013, 24 pages.

Surnilla, Gopichandra et al., "Methods and Systems for an Intake Oxygen Sensor," U.S. Appl. No. 14/032,109, filed Sep. 19, 2013, 44 pages.

Surnilla, Gopichandra et al., "Methods and Systems for an Intake Oxygen Sensor," U.S. Appl. No. 14/052,641, filed Oct. 11, 2013, 55 pages.

Surnilla, Gopichandra et al., "Methods and Systems for an Intake Oxygen Sensor," U.S. Appl. No. 14/052,633, filed Oct. 11, 2013, 39 pages.

Surnilla, Gopichandra et al., "Methods and Systems for an Oxygen Sensor," U.S. Appl. No. 14/052,637, filed Oct. 11, 2013, 55 pages.

Surnilla, Gopichandra et al., "Methods and Systems for an Oxygen Sensor," U.S. Appl. No. 14/052,635, filed Oct. 11, 2013, 55 pages.

Surnilla, Gopichandra et al., "Methods and Systems for an Intake Oxygen Sensor," U.S. Appl. No. 14/032,103, filed Sep. 19, 2013, 43 pages.

\* cited by examiner

METHODS AND SYSTEMS FOR PCV FLOW ESTIMATION WITH AN INTAKE OXYGEN SENSOR

BACKGROUND/SUMMARY

Engine systems may utilize recirculation of exhaust gas from an engine exhaust system to an engine intake system (intake passage), a process referred to as exhaust gas recirculation (EGR), to reduce regulated emissions and improve fuel economy. An EGR system may include various sensors to measure and/or control the EGR. As one example, the EGR system may include an intake gas constituent sensor, such as an oxygen sensor, which may be employed during non-EGR conditions to determine the oxygen content of fresh intake air. During EGR conditions, the sensor may be used to infer EGR based on a change in oxygen concentration due to addition of EGR as a diluent. One example of such an intake oxygen sensor is shown by Matsubara et al. in U.S. Pat. No. 6,742,379. The EGR system may additionally or optionally include an exhaust gas oxygen sensor coupled to the exhaust manifold for estimating a combustion air-fuel ratio.

As such, due to the location of the oxygen sensor downstream of a charge air cooler in the high pressure air induction system, the sensor may be sensitive to the presence of fuel vapor and other reductants and oxidants such as oil mist. For example, during boosted engine operation, purge air and/or blow-by gases may be received at a compressor inlet location. Hydrocarbons ingested from purge air, the positive crankcase ventilation (PCV), and/or rich EGR can consume oxygen on the sensor catalytic surface and reduce the oxygen concentration detected by the sensor. In some cases, the reductants may also react with the sensing element of the oxygen sensor. The reduction in oxygen at the sensor may be incorrectly interpreted as a diluent when using the change in oxygen to estimate EGR. Thus, the sensor measurements may be confounded by the various sensitivities, the accuracy of the sensor may be reduced, and measurement and/or control of EGR may be degraded.

In one example, the issues described above may be addressed by a method for an engine comprising: during operating with EGR flowing, adjusting an EGR valve based on an output of an intake oxygen sensor and PCV flow, the PCV flow identified during previous engine operation with EGR and purge disabled based on outputs of the intake oxygen sensor with and without boost. In this way, the hydrocarbon effect on the sensor from PCV flow can be nullified and the accuracy of EGR estimation can be improved.

For example, during engine operation when EGR is disabled (no EGR is flowing) and purge is disabled (e.g., a fuel canister purge valve is closed), a correction factor for the intake oxygen sensor, based on PCV flow, may be learned. Specifically, the correction factor may be based on a change in intake oxygen concentration (or reading) at the intake oxygen sensor between non-boosted and boosted engine operation. This is because when operating the engine without boost, and with purge disabled, PCV flow is received in the intake manifold directly, downstream of the intake oxygen sensor. Since the sensor output is not affected by the PCV hydrocarbons, the sensor output is reflective of the intake oxygen concentration. In comparison, when operating with boost, and purge disabled, PCV flow is received in the air induction system, upstream of the intake oxygen sensor. Here the sensor output is affected by the PCV hydrocarbons, and the sensor output is reflective of the PCV flow. Therefore, by comparing the sensor outputs with and without boost, a change in intake oxygen resulting from PCV flow may be learned and used to correct subsequent outputs from the sensor. For example, during subsequent engine operation when EGR is flowing and the fuel canister purge valve is closed, an output of the intake manifold oxygen sensor may be adjusted based on the correction factor. As a result, a contribution of PCV flow to intake oxygen may be removed from the output of the sensor. The resulting adjusted output may more accurately reflect the change in intake oxygen resulting from EGR. An EGR flow rate may be estimated based on the adjusted output, and an EGR valve may be accordingly adjusted for improved EGR control. Estimating EGR flow in this way may increase the accuracy of EGR flow rate estimates, thereby increasing EGR system control and maintaining engine emissions at target levels.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
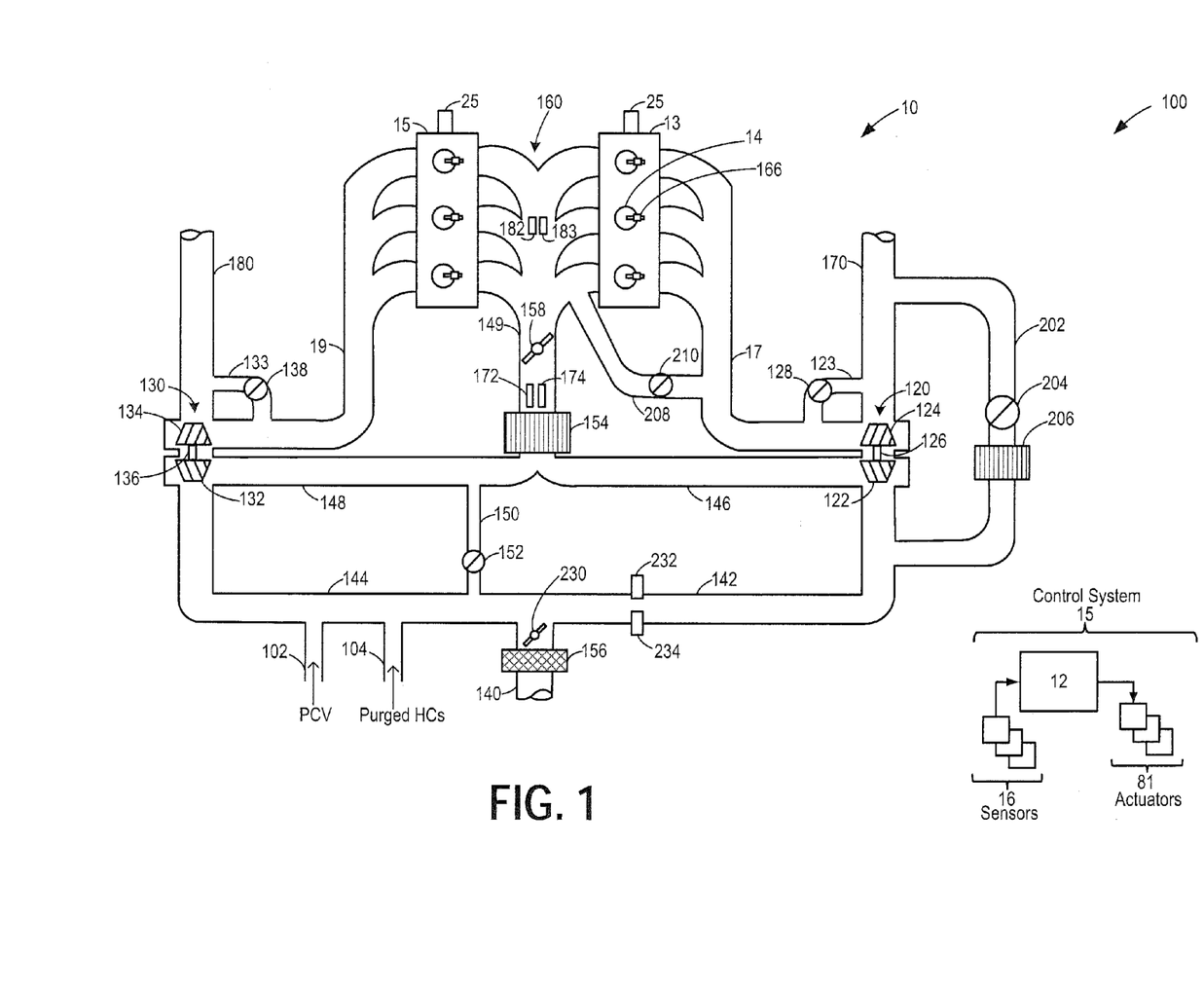
FIGS. 1-2 are schematic diagrams of an engine system.
Figure 2:
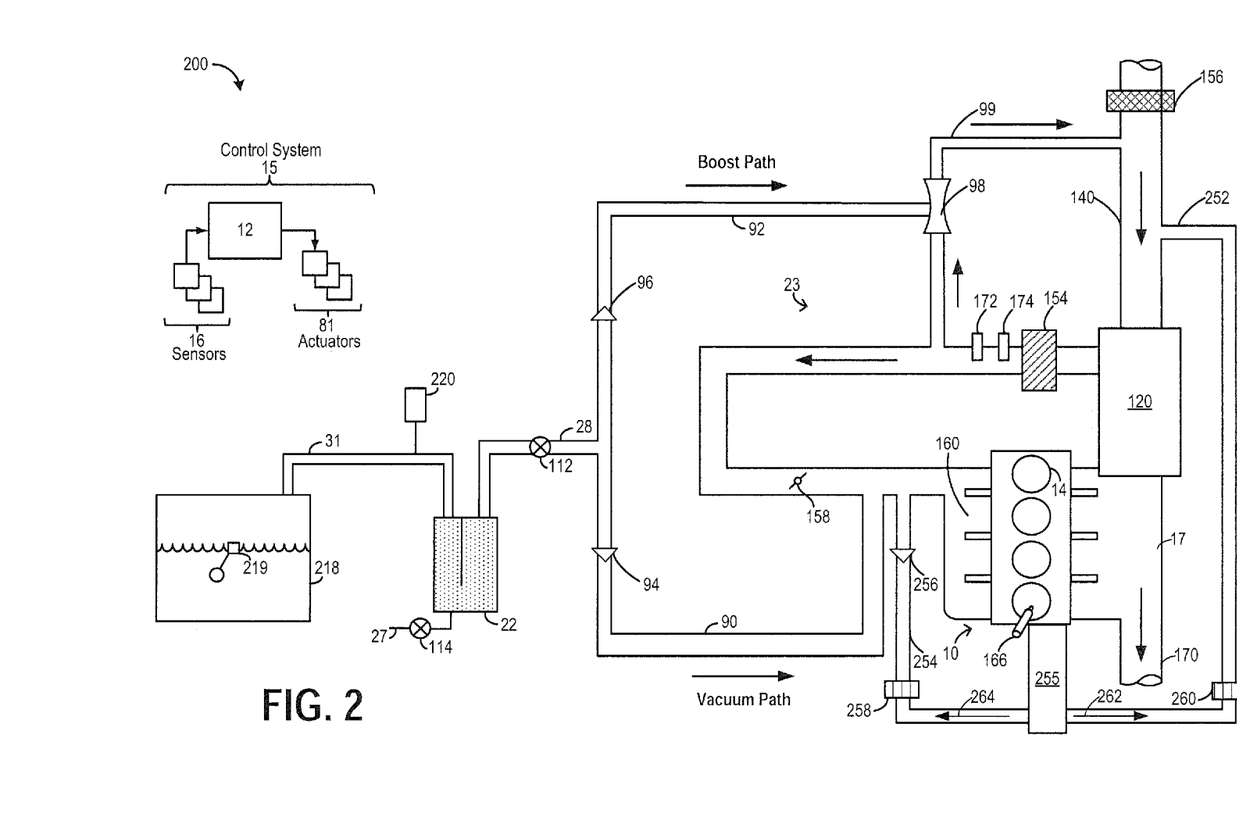
Figure 3:
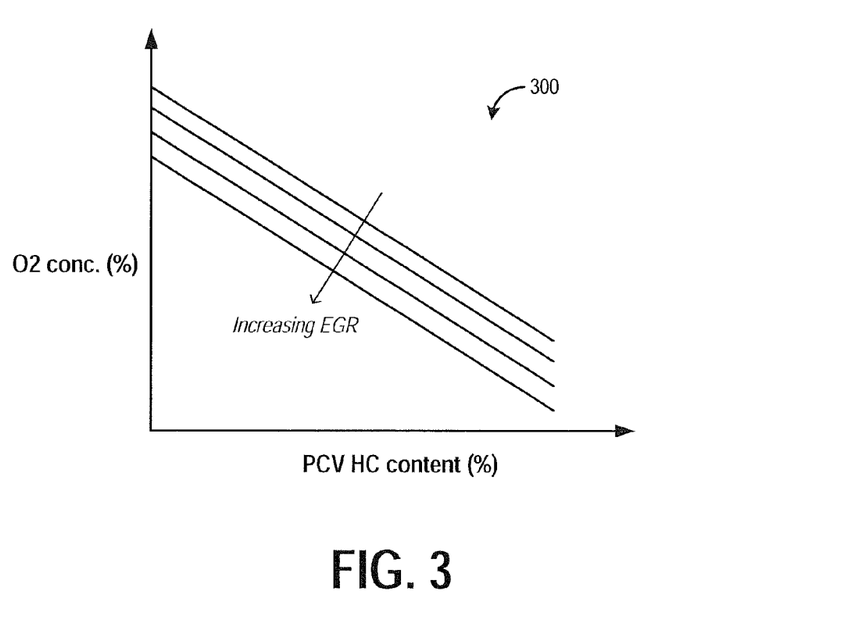
FIG. 3 is a map depicting the impact of purge air on the oxygen concentration estimated by an intake manifold oxygen sensor.
Figure 5:
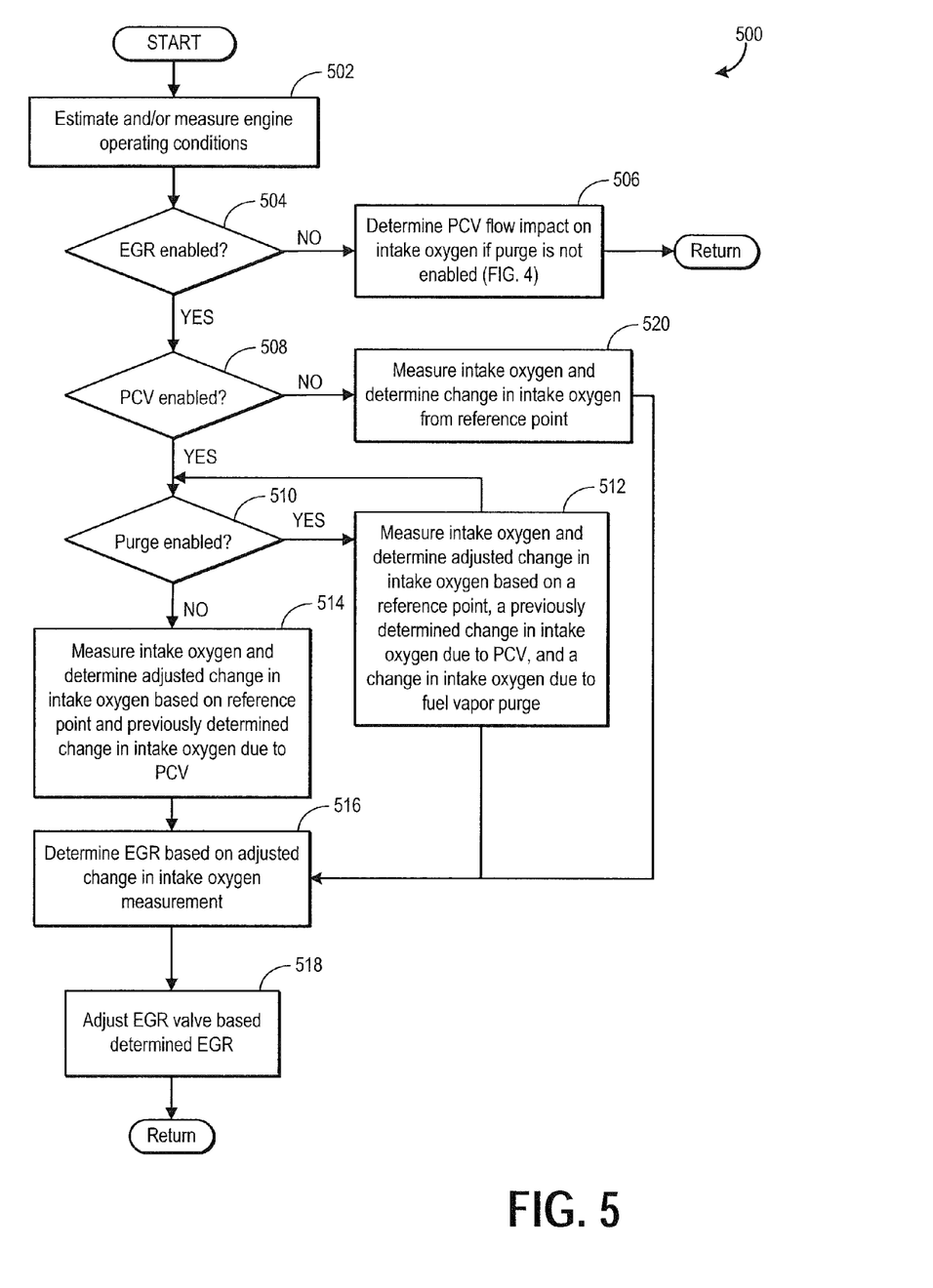
FIG. 5 depicts a flowchart for adjusting EGR operation based on a change in intake oxygen due to PCV flow.
Figure 6:
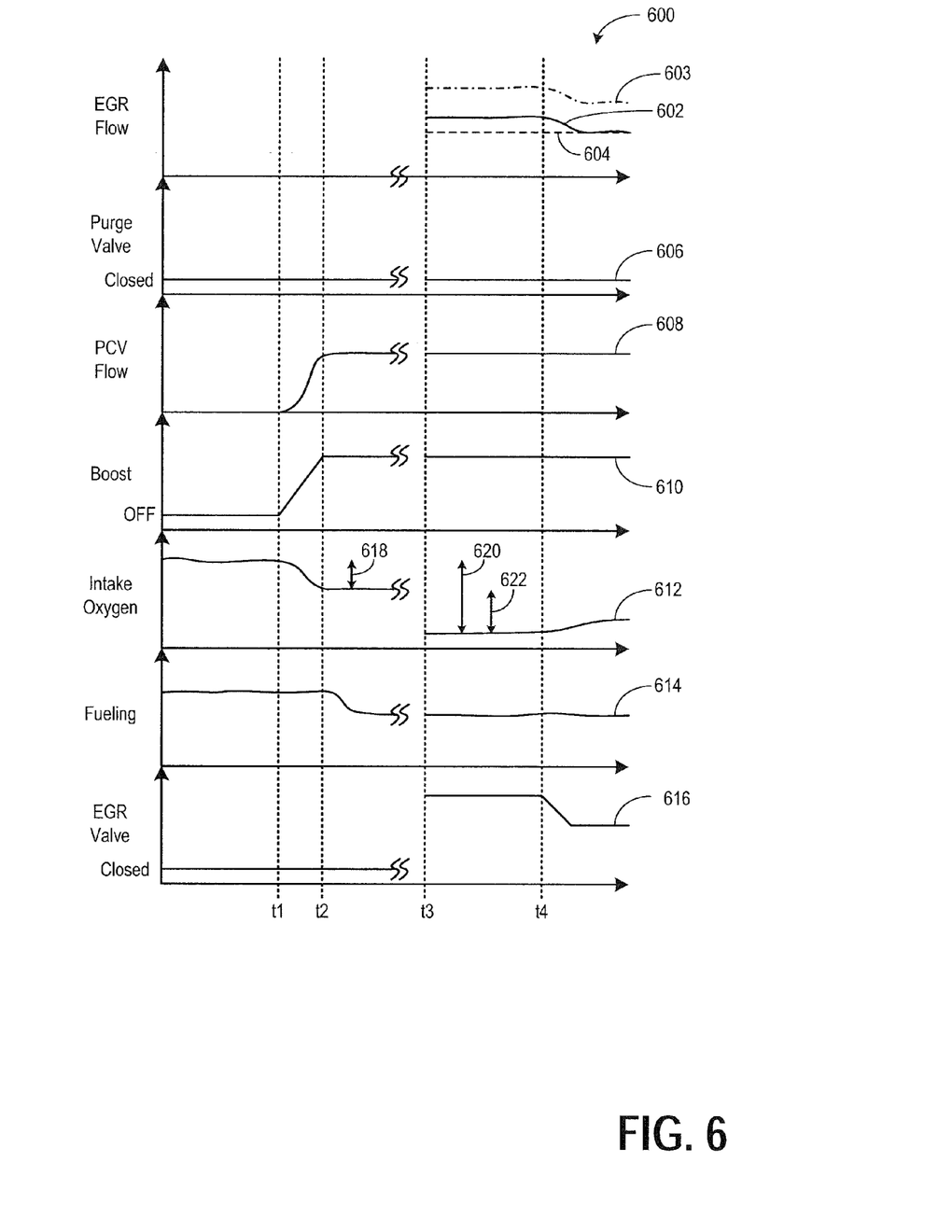
FIG. 6 depicts example adjustments to engine operating parameters based on changes in intake oxygen resulting from PCV flow.

The following description relates to systems and methods for using an intake oxygen sensor for estimating an amount of EGR flow to an engine system, such as the engine system of FIGS. 1-2. A controller may be configured to perform a control method, such as the method of FIG. 4 to learn an amount of crankcase hydrocarbons (e.g., PCV) ingested into an engine and when EGR and purge flow are disabled. Specifically, PCV flow may be estimated based on sensor outputs read with and without boost. Based on the learned PCV flow, EGR flow may be subsequently adjusted. Engine operation, such as engine fueling, may then be adjusted based on the estimated PCV flow. An output of the sensor, as well as an EGR dilution estimated by the sensor, may be adjusted to compensate for the effect of crankcase hydrocarbons on the output of the sensor (FIG. 3). As shown at FIG. 5, during engine operation when EGR is enabled, purge is disabled, and PCV is enabled, the controller may adjust the output of the sensor based on the learned amount of crankcase hydrocarbons (e.g., PCV flow). In this way, accuracy of EGR estimation by an intake oxygen sensor is increased. Example adjustments to engine operating parameters based on changes in intake oxygen resulting from PCV flow are shown at FIG. 6.

FIG. 1 shows a schematic depiction of an example turbocharged engine system 100 including a multi-cylinder internal combustion engine 10 and twin turbochargers 120 and 130. As one non-limiting example, engine system 100 can be included as part of a propulsion system for a passenger vehicle. Engine system 100 can receive intake air via intake passage 140. Intake passage 140 can include an air filter 156 and an EGR throttle valve 230. Engine system 100 may be a split-engine system wherein intake passage 140 is branched downstream of EGR throttle valve 230 into first and second parallel intake passages, each including a turbocharger compressor. Specifically, at least a portion of intake air is directed to compressor 122 of turbocharger 120 via a first parallel intake passage 142 and at least another portion of the intake air is directed to compressor 132 of turbocharger 130 via a second parallel intake passage 144 of the intake passage 140.

The first portion of the total intake air that is compressed by compressor 122 may be supplied to intake manifold 160 via first parallel branched intake passage 146. In this way, intake passages 142 and 146 form a first parallel branch of the engine's air intake system. Similarly, a second portion of the total intake air can be compressed via compressor 132 where it may be supplied to intake manifold 160 via second parallel branched intake passage 148. Thus, intake passages 144 and 148 form a second parallel branch of the engine's air intake system. As shown in FIG. 1, intake air from intake passages 146 and 148 can be recombined via a common intake passage 149 before reaching intake manifold 160, where the intake air may be provided to the engine.

A first EGR throttle valve 230 may be positioned in the engine intake upstream of the first and second parallel intake passages 142 and 144, while a second air intake throttle valve 158 may be positioned in the engine intake downstream of the first and second parallel intake passages 142 and 144, and downstream of the first and second parallel branched intake passages 146 and 148, for example, in common intake passage 149.

In some examples, intake manifold 160 may include an intake manifold pressure sensor 182 for estimating a manifold pressure (MAP) and/or an intake manifold temperature sensor 183 for estimating a manifold air temperature (MCT), each communicating with controller 12. Intake passage 149 can include a charge air cooler (CAC) 154 and/or a throttle (such as second throttle valve 158). The position of throttle valve 158 can be adjusted by the control system via a throttle actuator (not shown) communicatively coupled to controller 12. An anti-surge valve 152 may be provided to selectively bypass the compressor stages of turbochargers 120 and 130 via bypass passage 150. As one example, anti-surge valve 152 can open to enable flow through bypass passage 150 when the intake air pressure upstream of the compressors attains a threshold value.

Intake manifold 160 may further include an intake gas oxygen sensor 172. In one example, the oxygen sensor is a UEGO sensor. As elaborated herein, the intake gas oxygen sensor may be configured to provide an estimate regarding the oxygen content of fresh air received in the intake manifold. In addition, when EGR is flowing, a change in oxygen concentration at the sensor may be used to infer an EGR amount and used for accurate EGR flow control. In the depicted example, oxygen sensor 172 is positioned upstream of throttle 158 and downstream of charge air cooler 154. However, in alternate embodiments, the oxygen sensor may be positioned upstream of the CAC. A pressure sensor 174 may be positioned alongside the oxygen sensor for estimating an intake pressure at which an output of the oxygen sensor is received. Since the output of the oxygen sensor is influenced by the intake pressure, a reference oxygen sensor output may be learned at a reference intake pressure. In one example, the reference intake pressure is a throttle inlet pressure (TIP) where pressure sensor 174 is a TIP sensor. In alternate examples, the reference intake pressure is a manifold pressure (MAP) as sensed by MAP sensor 182.

Engine 10 may include a plurality of cylinders 14. In the depicted example, engine 10 includes six cylinders arrange in a V-configuration. Specifically, the six cylinders are arranged on two banks 13 and 15, with each bank including three cylinders. In alternate examples, engine 10 can include two or more cylinders such as 3, 4, 5, 8, 10 or more cylinders. These various cylinders can be equally divided and arranged in alternate configurations, such as V, in-line, boxed, etc. Each cylinder 14 may be configured with a fuel injector 166. In the depicted example, fuel injector 166 is a direct in-cylinder injector. However, in other examples, fuel injector 166 can be configured as a port based fuel injector.

Intake air supplied to each cylinder 14 (herein, also referred to as combustion chamber 14) via common intake passage 149 may be used for fuel combustion and products of combustion may then be exhausted from via bank-specific parallel exhaust passages. In the depicted example, a first bank 13 of cylinders of engine 10 can exhaust products of combustion via a first parallel exhaust passage 17 and a second bank 15 of cylinders can exhaust products of combustion via a second parallel exhaust passage 19. Each of the first and second parallel exhaust passages 17 and 19 may further include a turbocharger turbine. Specifically, products of combustion that are exhausted via exhaust passage 17 can be directed through exhaust turbine 124 of turbocharger 120, which in turn can provide mechanical work to compressor 122 via shaft 126 in order to provide compression to the intake air. Alternatively, some or all of the exhaust gases flowing through exhaust passage 17 can bypass turbine 124 via turbine bypass passage 123 as controlled by wastegate 128. Similarly, products of combustion that are exhausted via exhaust passage 19 can be directed through exhaust turbine 134 of turbocharger 130, which in turn can provide mechanical work to compressor 132 via shaft 136 in order to provide compression to intake air flowing through the second branch of the engine's intake system. Alternatively, some or all of the exhaust gas flowing through exhaust passage 19 can bypass turbine 134 via turbine bypass passage 133 as controlled by wastegate 138.

In some examples, exhaust turbines 124 and 134 may be configured as variable geometry turbines, wherein controller 12 may adjust the position of the turbine impeller blades (or vanes) to vary the level of energy that is obtained from the exhaust gas flow and imparted to their respective compressor. Alternatively, exhaust turbines 124 and 134 may be configured as variable nozzle turbines, wherein controller 12 may adjust the position of the turbine nozzle to vary the level of energy that is obtained from the exhaust gas flow and imparted to their respective compressor. For example, the control system can be configured to independently vary the vane or nozzle position of the exhaust gas turbines 124 and 134 via respective actuators.

Exhaust gases in first parallel exhaust passage 17 may be directed to the atmosphere via branched parallel exhaust passage 170 while exhaust gases in second parallel exhaust passage 19 may be directed to the atmosphere via branched parallel exhaust passage 180. Exhaust passages 170 and 180 may include one or more exhaust after-treatment devices, such as a catalyst, and one or more exhaust gas sensors.

Engine 10 may further include one or more exhaust gas recirculation (EGR) passages, or loops, for recirculating at least a portion of exhaust gas from the exhaust manifold to the intake manifold. These may include high-pressure EGR loops for proving high-pressure EGR (HP-EGR) and low-pressure EGR-loops for providing low-pressure EGR (LP-EGR). In one example, HP-EGR may be provided in the absence of boost provided by turbochargers 120, 130, while LP-EGR may be provided in the presence of turbocharger boost and/or when exhaust gas temperature is above a threshold. In still other examples, both HP-EGR and LP-EGR may be provided simultaneously.

In the depicted example, engine 10 may include a low-pressure EGR loop 202 for recirculating at least some exhaust gas from the first branched parallel exhaust passage 170, downstream of the turbine 124, to the first parallel intake passage 142, upstream of the compressor 122. In some embodiments, a second low-pressure EGR loop (not shown) may be likewise provided for recirculating at least some exhaust gas from the second branched parallel exhaust passage 180, downstream of the turbine 134, to the second parallel intake passage 144, upstream of the compressor 132. LP-EGR loop 202 may include LP-EGR valve 204 for controlling an EGR flow (i.e., an amount of exhaust gas recirculated) through the loops, as well as an EGR cooler 206 for lowering a temperature of exhaust gas flowing through the EGR loop before recirculation into the engine intake. Under certain conditions, the EGR cooler 206 may also be used to heat the exhaust gas flowing through LP-EGR loop 202 before the exhaust gas enters the compressor to avoid water droplets impinging on the compressors.

Engine 10 may further include a first high-pressure EGR loop 208 for recirculating at least some exhaust gas from the first parallel exhaust passage 17, upstream of the turbine 124, to intake manifold 160, downstream of intake throttle 158. Likewise, the engine may include a second high-pressure EGR loop (not shown) for recirculating at least some exhaust gas from the second parallel exhaust passage 18, upstream of the turbine 134, to the second branched parallel intake passage 148, downstream of the compressor 132. EGR flow through HP-EGR loops 208 may be controlled via HP-EGR valve 210.

A PCV port 102 may be configured to deliver crankcase ventilation gases (blow-by gases) to the engine intake manifold along second parallel intake passage 144. In some embodiments, flow of PCV air through PCV port 102 (e.g., PCV flow) may be controlled by a dedicated PCV port valve. Likewise, a purge port 104 may be configured to deliver purge gases from a fuel system canister to the engine intake manifold along passage 144. In some embodiments, flow of purge air through purge port 104 may be controlled by a dedicated purge port valve.

Humidity sensor 232 and pressure sensor 234 may be included in only one of the parallel intake passages (herein, depicted in the first parallel intake air passage 142 but not in the second parallel intake passage 144), downstream of EGR throttle valve 230. Specifically, the humidity sensor and the pressure sensor may be included in the intake passage not receiving the PCV or purge air. Humidity sensor 232 may be configured to estimate a relative humidity of the intake air. In one embodiment, humidity sensor 232 is a UEGO sensor configured to estimate the relative humidity of the intake air based on the output of the sensor at one or more voltages. Since purge air and PCV air can confound the results of the humidity sensor, the purge port and PCV port are positioned in a distinct intake passage from the humidity sensor. Pressure sensor 234 may be configured to estimate a pressure of the intake air. In some embodiments, a temperature sensor may also be included in the same parallel intake passage, downstream of the EGR throttle valve 230.

As such, intake oxygen sensor 172 may be used for estimating an intake oxygen concentration and inferring an amount of EGR flow through the engine based on a change in the intake oxygen concentration upon opening of the EGR valve 204. Specifically, a change in the output of the sensor upon opening the EGR valve is compared to a reference point where the sensor is operating with no EGR (the zero point). Based on the change (e.g., decrease) in oxygen amount from the time of operating with no EGR, an EGR flow currently provided to the engine can be calculated. For example, upon applying a reference voltage (Vs) to the sensor, a pumping current (Ip) is output by the sensor. The change in oxygen concentration may be proportional to the change in pumping current (delta Ip) output by the sensor in the presence of EGR relative to sensor output in the absence of EGR (the zero point). Based on a deviation of the estimated EGR flow from the expected (or target) EGR flow, further EGR control may be performed.

In one example, a zero point estimation of the intake oxygen sensor may be performed during idle conditions where intake pressure fluctuations are minimal and when no PCV or purge air is ingested into the low pressure induction system. In addition, the idle adaptation may be performed periodically, such as at every first idle following an engine start, to compensate for the effect of sensor aging and part-to-part variability on the sensor output.

A zero point estimation of the intake oxygen sensor may alternatively be performed during engine non-fueling conditions, such as during a deceleration fuel shut off (DFSO). By performing the adaptation during DFSO conditions, in addition to reduced noise factors such as those achieved during idle adaptation, sensor reading variations due to EGR valve leakage can be reduced.

In some cases, PCV flow from purge port 102 and/or purge flow from purge port 104 may cause an error in the EGR flow estimation with the intake oxygen sensor 172 (also referred to herein as the intake manifold oxygen sensor). As discussed further below, under boosted conditions PCV flow may result in a large change in oxygen concentration from the zero point. Said another way, PCV flow may cause a decrease in intake oxygen concentration measured by the intake oxygen sensor 172. The controller may infer the total change in intake oxygen is due to EGR, thereby incorrectly estimating the EGR flow during PCV flow conditions. Methods for correcting for PCV flow are discussed further below with reference to FIGS. 4-5.

Returning to FIG. 1, the position of intake and exhaust valves of each cylinder 14 may be regulated via hydraulically actuated lifters coupled to valve pushrods, or via a direct acting mechanical bucket system in which cam lobes are used. In this example, at least the intake valves of each cylinder 14 may be controlled by cam actuation using a cam actuation system. Specifically, the intake valve cam actuation system 25 may include one or more cams and may utilize variable cam timing or lift for intake and/or exhaust valves. In alternative embodiments, the intake valves may be controlled by electric valve actuation. Similarly, the exhaust valves may be controlled by cam actuation systems or electric valve actuation.

Engine system 100 may be controlled at least partially by a control system 15 including controller 12 and by input from a vehicle operator via an input device (not shown). Control system 15 is shown receiving information from a plurality of sensors 16 (various examples of which are described herein) and sending control signals to a plurality of actuators 81. As one example, sensors 16 may include humidity sensor 232, intake air pressure sensor 234, MAP sensor 182, MCT sensor 183, TIP sensor 174, and intake air oxygen sensor 172. In some examples, common intake passage 149 may further include a throttle inlet temperature sensor for estimating a throttle air temperature (TCT). In other examples, one or more of the EGR passages may include pressure, temperature, and air-to-fuel ratio sensors, for determining EGR flow characteristics. As another example, actuators 81 may include fuel injector 166, HP-EGR valve 210, LP-EGR valve 204, throttle valves 158 and 230, and wastegates 128, 138. Other actuators, such as a variety of additional valves and throttles, may be coupled to various locations in engine system 100. Controller 12 may receive input data from the various sensors, process the input data, and trigger the actuators in response to the processed input data based on instruction or code programmed therein corresponding to one or more routines. Example control routines are described herein with regard to FIGS. 4-5.

Now turning to FIG. 2, another example embodiment 200 of the engine of FIG. 1 is shown. As such, components previously introduced in FIG. 1 are numbered similarly and not re-introduced here for reasons of brevity.

Embodiment 200 shows a fuel tank 218 configured to deliver fuel to engine fuel injectors. A fuel pump (not shown) immersed in fuel tank 218 may be configured to pressurize fuel delivered to the injectors of engine 10, such as to injector 166. Fuel may be pumped into the fuel tank from an external source through a refueling door (not shown). Fuel tank 218 may hold a plurality of fuel blends, including fuel with a range of alcohol concentrations, such as various gasoline-ethanol blends, including E10, E85, gasoline, etc., and combinations thereof. A fuel level sensor 219 located in fuel tank 218 may provide an indication of the fuel level to controller 12. As depicted, fuel level sensor 219 may comprise a float connected to a variable resistor. Alternatively, other types of fuel level sensors may be used. One or more other sensors may be coupled to fuel tank 218 such as a fuel tank pressure transducer 220 for estimating a fuel tank pressure.

Vapors generated in fuel tank 218 may be routed to fuel vapor canister 22, via conduit 31, before being purged to the engine intake 23. The engine intake 23 may include intake passage 140 and intake manifold 160. Vapors purged to the engine intake 23 may include, for example, diurnal and refueling fuel tank vapors. The canister may be filled with an appropriate adsorbent, such as activated charcoal, for temporarily trapping fuel vapors (including vaporized hydrocarbons) generated in the fuel tank. Then, during a later engine operation, when purge conditions are met, such as when the canister is saturated, the fuel vapors may be purged from the canister into the engine intake by opening canister purge valve 112 and canister vent valve 114.

Canister 22 includes a vent 27 for routing gases out of the canister 22 to the atmosphere when storing, or trapping, fuel vapors from fuel tank 218. Vent 27 may also allow fresh air to be drawn into fuel vapor canister 22 when purging stored fuel vapors to engine intake 23 via purge line 28, boost path 92 or vacuum path 90 (depending on boost level), and purge valve 112. Boost path 92 and vacuum path 90 may also be referred to herein as purge liens. While this example shows vent 27 communicating with fresh, unheated air, various modifications may also be used. Vent 27 may include a canister vent valve 114 to adjust a flow of air and vapors between canister 22 and the atmosphere. The vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister.

Fuel vapors released from canister 22, for example during a purging operation, may be directed into either boost path 92 or vacuum path 90 via purge line 28. The flow of vapors along purge line 28 may be regulated by canister purge valve 112, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc.

An optional canister check valve (not shown) may be included in purge line 28 to prevent intake manifold pressure from flowing gases in the opposite direction of the purge flow. As such, the check valve may be necessary if the canister purge valve control is not accurately timed or the canister purge valve itself can be forced open by a high intake manifold pressure. An estimate of the manifold absolute pressure (MAP) may be obtained from MAP sensor coupled to intake manifold 160, and communicated with controller 12. Alternatively, MAP may be inferred from alternate engine operating conditions, such as mass air flow (MAF), as measured by a MAF sensor coupled to the intake manifold.

Purge hydrocarbons may be directed to intake manifold 160 via either a boost path 92 or a vacuum path 90 based on engine operating conditions. Specifically, during conditions when turbocharger 120 is operated to provide a boosted aircharge to the intake manifold, the elevated pressure in the intake manifold causes one-way valve 94 in the vacuum path 90 to close while opening one-way valve 96 in the boost path 92. As a result, purge air is directed into the air intake passage 140, downstream of air filter 156 and upstream of charge air cooler 154 via the boost path 92. Herein, the purge air is introduced upstream of intake air sensor 172. In some embodiments, as depicted, a venturi 98 may be positioned in the boost path such that the purge air is directed to the intake upon passing through the venturi and passage 99. This allows the flow of purge air to be advantageously harnessed for vacuum generation.

During conditions when engine 10 is operated without boost, elevated vacuum in the intake manifold causes one-way valve 94 in the vacuum path to open while closing one-way valve 96 in the boost path. As a result, purge air is directed into the intake manifold 160, downstream of throttle 158 via the vacuum path 90. Herein, the purge air is introduced downstream of intake oxygen sensor 172, directly into intake manifold 160, and therefore does not affect the output of oxygen sensor 172. In comparison, during conditions when engine 10 is operated with boost, the purge air is introduced upstream of intake oxygen sensor 172, and therefore does affect the output of oxygen sensor 172.

PCV hydrocarbons may also be directed to intake manifold 160 via either a boost side PCV hose 252 or a vacuum side PCV hose 254 based on engine operating conditions. Specifically, blow-by gases from engine cylinders 14 flow past the piston rings and enter crankcase 255. During conditions when turbocharger 120 is operated to provide a boosted aircharge to the intake manifold, the elevated pressure in the intake manifold causes one-way valve 256 in vacuum side PCV hose 254 to close. As a result, during boosted engine operating, PCV gases flow in a first direction (arrow 262) and are received in the engine intake downstream of the intake oxygen sensor. Specifically, PCV air is directed into the air intake passage 140, downstream of air filter 156 and upstream of charge air cooler 154 via boost side PCV hose 252. The PCV flow may be directed to the intake passage upon passage through a boost side oil separator 260. The boost side oil separator may be integrated into the cam cover or may be an external component. Thus, during boosted conditions, the PCV gases are introduced upstream of intake oxygen sensor 172 and therefore do affect the output of oxygen sensor 172.

In comparison, during conditions when engine 10 is operated without boost, elevated vacuum in the intake manifold causes one-way valve 256 in the vacuum side PCV hose 254 to open. As a result, during non-boosted engine operating, PCV gases flow in a second direction (arrow 264) different from the first direction and are received in the engine intake downstream of the intake oxygen sensor. In the depicted example, the second direction of PCV flow during non-boosted engine operation is opposite of the first direction of PCV flow during boosted engine operation (compare arrows 262 and 264). Specifically, during non-boosted operation, PCV air is directed into the intake manifold 160, directly, downstream of throttle 158 via the vacuum side PCV hose 254. Herein, the PCV air is introduced downstream of intake oxygen sensor 172, and therefore does not affect the output of oxygen sensor 172.

Thus the systems of FIGS. 1-2 provide for an engine system, comprising an engine including an intake manifold, a crankcase coupled to the intake manifold via a PCV valve, a turbocharger with an intake compressor, an exhaust turbine, and a charge air cooler, an intake throttle coupled to the intake manifold downstream of the charge air cooler, a canister configured to receive fuel vapors from a fuel tank, the canister coupled to the intake manifold via a purge valve, an EGR system including a passage for recirculating exhaust residuals from downstream of the turbine to upstream of the compressor via an EGR valve, an oxygen sensor coupled to the intake manifold, downstream of the charge air cooler and upstream of the intake throttle, and a controller with computer readable instructions for: learning a correction factor for an intake oxygen sensor based on PCV flow and boost conditions and adjusting a position of the EGR valve based on an output of the intake oxygen sensor relative to the correction factor.

As described further below, learning the correction factor includes determining a change in intake oxygen at the intake oxygen sensor between boosted and non-boosted engine operation while each of EGR and purge is disabled (that is, when both the EGR valve and the purge valve are closed). The controller may include further instructions for estimating an EGR flow rate based on a change in intake oxygen due to EGR, the change in intake oxygen due to EGR determined by subtracting an amount of PCV hydrocarbons (e.g., the previously learned correction factor) from the output of the intake oxygen sensor.

As previously discussed, the intake air oxygen sensor 172 can be used to measure the amount of EGR in the intake aircharge as a function of the amount of change in oxygen content due to the addition of EGR as a diluent. Thus, as more EGR is introduced, the sensor may output a reading or pumping current corresponding to a lower oxygen concentration. During the estimation, a nominal reference voltage (e.g., at 450 mV), or Nernst voltage, is applied to the sensor and an output (e.g., a pumping current output by the sensor upon application of the lower reference voltage) is noted. Based on the output of the sensor relative to a zero point of the sensor (that is, sensor output at no EGR conditions), a change in oxygen concentration is learned, and an intake dilution with EGR is inferred.

However, if the EGR estimation is performed during conditions when purging and/or crankcase ventilation is enabled (e.g., PCV flow is enabled), an output of the sensor is corrupted. Said another way, PCV and/or fuel vapor purge flow may cause an error in the output of the intake oxygen sensor. As such, purge air and/or positive crankcase ventilation hydrocarbons (e.g., PCV flow) may be ingested during boosted engine operating conditions along boost path 92 and boost side PCV hose 252 when the purge valve 112 is open and/or the PCV valve 256 is closed. The sensor output may be corrupted primarily due to the ingested hydrocarbons reacting with ambient oxygen at the sensing element of the intake sensor. This reduces the (local) oxygen concentration read by the sensor. Since the output of the sensor and the change in oxygen concentration is used to infer an EGR dilution of intake aircharge, the reduced oxygen concentration read by the intake oxygen sensor in the presence of purge air and/or PCV may be incorrectly interpreted as additional diluent. This impacts the EGR estimation and the subsequent EGR control. Specifically, EGR may be over-estimated.

FIG. 3 depicts this variation in the reading of the intake sensor. Specifically, map 300 depicts an oxygen concentration estimated by an intake manifold oxygen sensor along the y-axis and a PCV hydrocarbon (HC) content along the x-axis at a given EGR level. As the amount of PCV HCs ingested into the engine intake manifold increases, such as when PCV is enabled during boosted conditions, the hydrocarbons react with oxygen at the sensing element of the intake oxygen sensor. The oxygen is consumed and water and carbon dioxide is released. As a result, the estimated oxygen concentration is reduced, even though an amount of EGR flow may remain constant. This reduction in oxygen concentration estimated by the oxygen sensor may be inferred as an increased dilution (or replacement of oxygen with EGR). Thus, the controller may infer that there is a larger amount of EGR flow available than actually is present. If not corrected for the hydrocarbon effect, a controller may decrease EGR flow in response to an incorrect indication of higher EGR dilution, degrading EGR control. For example, during purge and/or PCV flow conditions resulting in EGR over-estimation, the controller may decrease an opening of the EGR valve in response to a higher EGR estimate (based on a lower intake oxygen measurement from the intake oxygen sensor). However, actual EGR may be lower than the estimated level. Thus, EGR flow may be incorrectly reduced instead of maintained or increased. This may, in turn, result in increased engine emissions and degraded engine performance.

In one example, adjusting an intake oxygen measurement based on PCV flow may increase the accuracy of EGR flow estimates. Specifically, under certain engine operating conditions, an engine controller (such as controller 12 shown in FIG. 1) may determine a PCV flow contribution to the intake oxygen concentration measured at an intake oxygen sensor (such as the intake oxygen sensor 172 shown in FIGS. 1-2). If the PCV flow effect on intake oxygen under boost conditions is known, the controller may use this to correct the measured intake oxygen used to estimate EGR flow. As such, the EGR estimate may be corrected based on PCV flow.

The effect of PCV flow on intake oxygen measurements may be learned as a function of boost pressure. As discussed above, PCV flow may only be enabled (e.g., flowing) during boosted conditions (e.g., wherein intake air is being boosted by the turbocharger). During engine operating conditions when EGR is not enabled (e.g., EGR valve is closed and/or EGR is not flowing) and fuel vapor purge is not enabled (e.g., fuel canister purge valve is closed), the PCV impact on the intake oxygen sensor output may be determined. Specifically, during these conditions, intake oxygen may be measured by the intake oxygen sensor while the engine is not boosted. Then, the controller may turn on boost and again measure the intake oxygen at the intake oxygen sensor. A change in intake oxygen between the non-boosted and boosted conditions may then represent the contribution of PCV flow to the decrease in intake oxygen from a reference point (e.g., zero point). This change in intake oxygen due to PCV flow may then be stored (e.g., stored in a memory of the controller) as a function of boost pressure and used to adjust EGR flow estimates during subsequent engine operation wherein EGR and PCV flow are enabled. For example, during engine operation with EGR flowing, the controller may obtain an intake oxygen measurement from the intake oxygen sensor. A difference between the reference point (e.g., zero point) and the intake oxygen measurement then represents a total change in intake oxygen due to system diluents (EGR and PCV). The previously determined change in intake oxygen due to PCV at the current boost value may then be subtracted from the total change in intake oxygen to determine an actual change in intake oxygen due to EGR. This value may then be used to estimate EGR flow.

In addition to correcting EGR estimates, the change in intake oxygen due to PCV flow may be used to accurately estimate PCV flow. Specifically, a change in intake oxygen between boosted and non-boosted conditions, measured at the intake oxygen sensor, may be converted to equivalent hydrocarbons. Since during boosted engine operation, with EGR and purge disabled, the hydrocarbons ingested are from blow-by gases, the equivalent hydrocarbons may be used to estimate PCV flow. The controller may use PCV flow estimates to monitor and diagnose the PCV system and adjust fueling to the engine. For example, as the estimated PCV flow increases, the controller may decrease fueling to the engine. In this way, the controller may adjust fuel injection based on PCV flow estimates. Methods for determining a change in intake oxygen resulting from PCV flow and estimating EGR and PCV flow based on the change in intake oxygen from PCV flow are discussed further below with reference to FIGS. 4-5.

In this way, a method for an engine comprises estimating PCV flow based on a change in intake oxygen between non-boosted and boosted engine operation when exhaust gas recirculation is disabled (e.g., EGR not flowing and an EGR valve in a low pressure EGR passage is closed) and purging is disabled (e.g., a purge valve coupled between a fuel system canister and an engine intake is closed), the change in intake oxygen measured by an intake manifold oxygen sensor. The method further includes adjusting engine fueling based on the estimated PCV flow. In one example, the method may include decreasing engine fueling as the estimated PCV flow increases. The method may further comprise learning the change in intake oxygen as a function of boost pressure, for example, in a look-up table stored in the engine controller's memory (e.g., in the KAM). Additionally, during subsequent engine operation with exhaust gas recirculation enabled and the fuel canister purge valve is closed, the method may include estimating an exhaust gas recirculation flow rate based on an output of the intake manifold oxygen sensor adjusted based on the learned change in intake oxygen and an intake oxygen sensor reference point. Further, the method may include adjusting an exhaust gas recirculation valve based on the estimated exhaust gas recirculation flow rate relative to a target exhaust gas recirculation flow rate, the target exhaust gas recirculation flow rate based on engine speed-load conditions.

Figure 4:
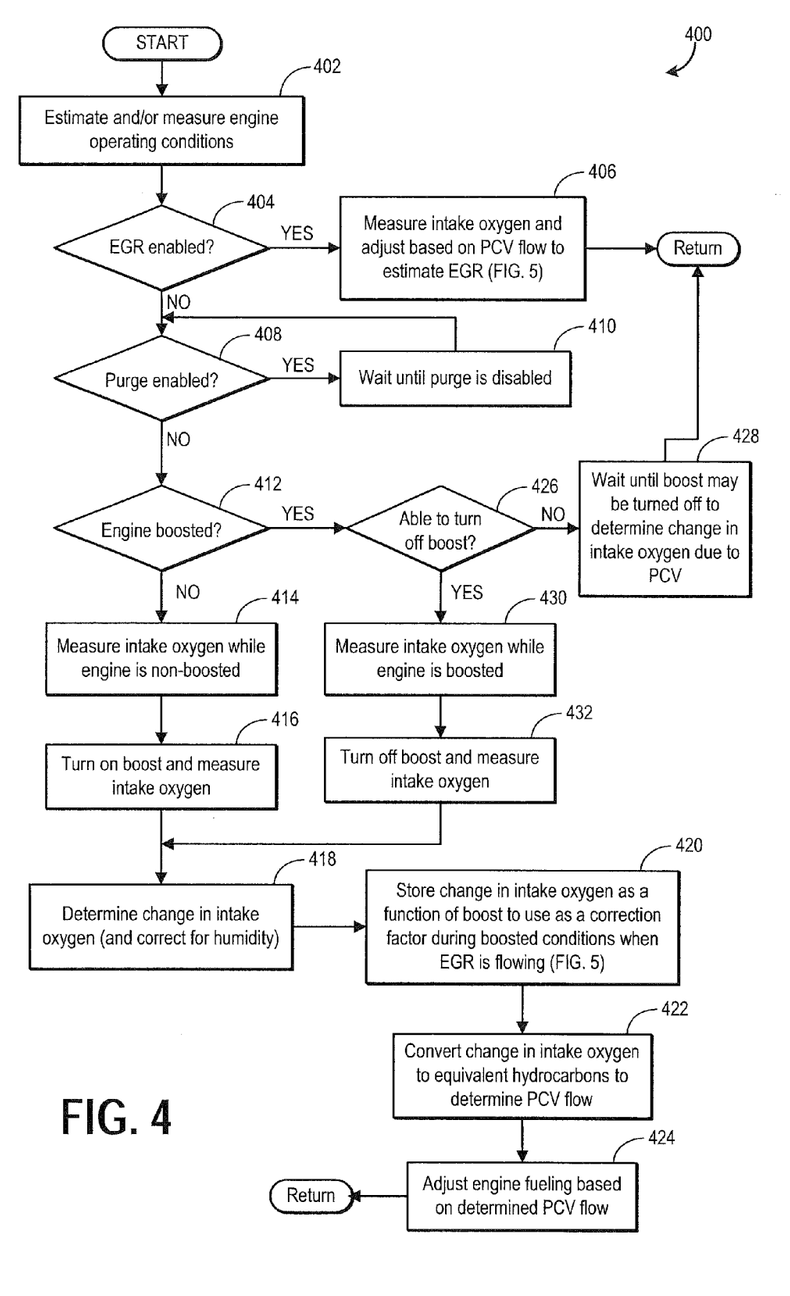
FIG. 4 depicts a flowchart for determining a change in intake oxygen resulting from PCV flow.

Turning now to FIG. 4, a method 400 is shown for determining a change in intake oxygen resulting from PCV flow. Fueling to the engine may then be adjusted based on PCV flow estimated from the change in intake oxygen. In one example, intake oxygen may be measured by an intake oxygen sensor, such as intake oxygen 172 shown in FIGS. 1-2. Instructions for executing method 400 may be stored in a memory of a controller of the engine, such as controller 12 shown in FIG. 1.

At 402 the method includes estimating and/or measuring engine operating conditions. These may include, for example, engine speed and load, torque demand, boost, EGR, engine dilution required, engine temperature, BP, MAP, etc. At 404, the method includes determining if EGR is enabled. In one example, EGR may be enabled based on engine speed-load conditions where EGR benefits can be achieved. For example, EGR may be enabled when engine speed is above a threshold speed (e.g., above an idle speed) and when engine load is above a threshold load (e.g., above a minimum load). The controller may determine EGR is enabled if an EGR valve is open and EGR is flowing through an EGR passage (e.g., such as anti-surge valve 152 or HP-EGR valve 210 and EGR passage 150 or 208 shown in FIG. 1). As used herein, the EGR refers to a low pressure EGR recirculated from an exhaust manifold, downstream of a turbine, to an intake manifold, upstream of a compressor. If EGR is enabled (e.g., EGR is flowing to the intake passage), the method continues on to 406 to measure intake oxygen and adjust the intake oxygen measurement based on PCV flow in order to estimate EGR. Specifically, the intake oxygen measurement may be adjusted to account for and remove the intake oxygen contribution due to PCV flow as determined during previous engine operation (as shown at 412-418 of FIG. 4). In this way, the controller may obtain a more accurate EGR flow estimate. A method for adjusting the intake oxygen and estimating EGR based on PCV flow is presented at FIG. 5, explained further below.

If EGR is disabled at 404, for example if EGR is not flowing and the EGR valve is closed, the method continues to 408 to determine if fuel canister purging is enabled. As introduced above, a fuel vapor canister (such as fuel vapor canister 22 shown in FIG. 2) may be purged when a canister load is higher than a threshold, the engine is running, and a purge valve is open. As such, if purge air is received in the intake aircharge, purge hydrocarbons (HCs) may be ingested along with exhaust residuals in the EGR. These hydrocarbons may react with oxygen at the sensing element of the intake oxygen sensor, generating carbon dioxide and water. The resulting lowering of oxygen concentration leads to a misrepresentation of engine dilution. Furthermore, in the presence of purge air, a controller may not be able to distinguish the effect on purge hydrocarbons on the oxygen sensor relative to those of PCV hydrocarbons. Thus, if purge is enabled at 408, the method continues on to 410 to wait until the fuel canister purge valve closes, thereby indicating that purge is disabled. Alternately, the method may close the purge valve at 410 to permit the PCV learning to take place. In other words, PCV flow estimation based on the intake oxygen sensor is only performed if there is no other reductant contribution from EGR or purge air.

When the fuel canister purge valve is closed and purge is disabled, the method proceeds to 412 to determine if the engine is boosted. In one example, determining if the engine is boosted may include determining if MAP is greater than the compressor inlet pressure (CIP). If the engine is not boosted (e.g., also referred to as a non-boosted condition where MAP is less than CIP), the method continues on to 414 where the intake oxygen sensor measures intake oxygen while the engine is non-boosted. As discussed above, an output of the oxygen sensor may reflect an intake oxygen concentration of the intake air. The method then proceeds to 416 to enable or turn on boost (e.g., operate the engine under boosted conditions) and measure the intake oxygen concentration of the air with the intake oxygen sensor. Alternatively, the method at 416 may include waiting until the engine enters boosted operation via driver demand (e.g., enters boosted operation responsive to engine operating conditions) and then measuring the intake oxygen with the intake oxygen sensor during the boosted operation. At 418, the controller determines the change (e.g., difference) in intake oxygen concentration (or sensor outputs) between the boosted and non-boosted conditions. The difference in intake oxygen sensor output between the boosted and the non-boosted conditions is indicative of a (first) change in intake oxygen due to PCV flow. In some examples, the (first) change in intake oxygen may also be corrected based on humidity (e.g., based on a humidity reading from a humidity sensor). This may include adjusting the sensor outputs and/or the difference in sensor outputs based on an ambient humidity estimate to either remove the effect of all ambient humidity (so as to standardize to dry ambient conditions) or to adjust to a known amount of ambient humidity (so as to standardize to a pre-defined and calibrated amount of ambient humidity).

At 420, the controller may store the change in intake oxygen due to PCV as a function of boost. In one example, the controller may include a look-up table of change in intake oxygen from PCV flow as a function of boost pressure stored in a memory (e.g., KAM) of the controller. The look-up table may be updated with the learned change in intake oxygen determined at 418 at the corresponding boost pressure. The learned value may then be used as a correction factor during boosted conditions when EGR is flowing, as discussed further below with reference to FIG. 5. In some examples, the table may be continually updated during engine operation when EGR and purge are both disabled (e.g., turned off). In another example, once the table is populated with change in intake oxygen data at a range of boost pressures, the controller may only update the table after a duration of engine operation. For example, the controller may update the PCV intake oxygen data after a defined number of hours of engine operation or a defined number of drive cycles. In another example, the controller may update the PCV intake oxygen data after a number of engine starts or repeated cold start conditions. For example, the controller may update the PCV intake oxygen data once ever ten engine starts in cold weather (e.g., in a temperature below a threshold). Further, if significant PCV flow is detected, thereby indicating increased fuel dilution of the oil, the PCV intake oxygen data may be updated more frequently until the fuel evaporates from the oil (e.g., as indicated by a decrease in the estimated PCV flow rate). In this way, the rate of updated the PCV intake oxygen data may be adjusted based on the determined PCV flow, engine temperatures, ambient temperatures, and/or additional engine operating conditions.

At 422, the method includes converting the change in intake oxygen due to PCV flow to equivalent hydrocarbons in order to estimate the PCV flow. Specifically, based on the change in oxygen concentration due to PCV, an amount or concentration of hydrocarbons may be determined. This may then be used as an estimate of PCV flow to the engine intake. In one example, the PCV flow estimate may be used to monitor the PCV system and determine if the system is degraded. For example, changes in the intake oxygen sensor reading between boosted and non-boosted conditions may be an indication that the PCV system is flowing as expected and is not blocked or does not have a disconnected hose. If the change in the intake oxygen reading between boosted and non-boosted conditions is larger than a threshold, it may indicate a significant amount of fuel hydrocarbons coming from PCV. This may falsely trigger fuel system monitoring. Therefore, this information may be used to disable the fuel system monitor.

In another example, as shown at 424, the controller may adjust fueling to the engine based on the determined PCV flow. For example, the controller may adjust the mass and/or volume of fuel delivered to engine cylinders. In one example, as the PCV flow increases, fueling to the engine (e.g., the mass and/or volume of fuel delivered via fuel injectors) may be decreased. In one example, the amount of fuel coming from the PCV flow is estimated by determining the amount of intake oxygen change due to PCV and converting it to the amount of fuel vapor. The change in intake oxygen is converted to a mass of fuel assuming that the fuel in the PCV is the same as the fuel type in the fuel in the injectors (e.g., the nominal stoichiometric air/fuel ratio of fuel in PCV is assumed to be that of fuel in the injectors). In still other examples, a timing of fueling may also be adjusted.

Returning to 412, if the engine is boosted instead of non-boosted, the method proceeds to 426. At 426, the method includes determining if the engine is able to switch to non-boosted operation (e.g., able to turn off boost). If the engine is not able to disable the boost (e.g., due to torque demand), the method continues on to 428 to wait until the boost may be disabled to determine the change in intake oxygen due to PCV. In one example, the engine may not be able to operate un-boosted if torque demand is over a threshold, thereby requiring MAP to be greater than barometric pressure (BP). Conversely, if the engine is able to turn off boost at 426, the method continues on to 430 to measure the intake oxygen via the intake oxygen sensor while the engine is still boosted. Then, at 432, the boost is turned off and the intake oxygen is measured again via the intake oxygen sensor while the engine is non-boosted. Alternatively, the method at 432 may include waiting until the engine switches to non-boosted operation in response to torque demand or other engine operating conditions. Then, after switching to non-boosted operation, the controller may measure the intake oxygen via the intake oxygen sensor. The method then continues on to 418 to determine the change in intake oxygen between the boosted and non-boosted conditions, as described above. In alternate embodiments, the method may proceed from 426 to turn off the boost and then measure the intake oxygen. Then, the method may continue on to 416 to again turn on the boost and measure the intake oxygen. In other words, when the engine is not boosted, the routine includes first obtaining an output during non-boosted operation and then operating the engine boosted, even if boost is not required, and obtaining an output during boosted operation. In comparison, when the engine is boosted, the routine includes first obtaining an output during boosted operation and then operating the engine non-boosted, if torque demand is below a threshold, and obtaining an output during non-boosted operation.

The method may then proceed to steps 418-424 as described above to estimate the PCV flow, corrected for humidity, and adjust engine fueling based on the estimated PCV flow. As discussed above, in one example, estimating PCV flow (e.g., learning the PCV correction factor for EGR estimation) via method 400 may occur at a first frequency, the first frequency based on a threshold number of engine starts. For example, the threshold number of engine starts may include engine starts in a range of approximately 10 to 100. Additionally, the frequency of estimating PCV flow and learning the PCV correction factor may increase from the first frequency to a higher, second frequency in response to an increase in the estimated PCV flow over a threshold. The estimating PCV flow at the second frequency may then be maintained until the estimated PCV flow decreases back below the threshold, the second frequency increasing with an increasing magnitude of the estimated PCV flow. In this way, the frequency of estimating PCV flow may be based on changes in the estimated PCV and a magnitude of the estimated PCV flow.

Now turning to FIG. 5, a method 500 is shown for adjusting EGR operation based on a change in intake oxygen due to PCV flow. As described above, when EGR is flowing, an EGR estimate based on intake oxygen measured may be adjusted (e.g., corrected) based on the contribution of PCV to an overall change in intake oxygen from a reference point. As a result, a more accurate EGR flow estimate may be determined, thereby resulting in increased EGR system control and reduced emissions. As described above, in one example, intake oxygen may be measured by an intake oxygen sensor, such as intake oxygen 172 shown in FIGS. 1-2. Instructions for executing method 500 may be stored in a memory of a controller of the engine, such as controller 12 shown in FIG. 1.

The method begins at 502 by estimating and/or measuring engine operating conditions. In one example, engine operating conditions may include engine speed and load, torque demand, MAF, MAP, EGR, a position of an EGR valve, PCV valve, and fuel canister purge valve, boost, EGR, engine dilution required, engine temperature, BP, etc. At 504, the method includes determining if EGR is enabled. As discussed above, EGR may be enabled if the EGR valve is at least partially open with EGR flowing through the low pressure EGR passage and into the engine intake. If EGR is not enabled (e.g., the EGR valve is in a closed position and EGR is not flowing), the method proceeds to 506 to determine the PCV flow impact on intake oxygen if purge is not enabled, as described at FIG. 4. For example, if EGR is not flowing and the fuel canister purge valve is closed, a change in intake oxygen between boosted and non-boosted conditions may be compared in order to determine the PCV effect on intake oxygen measurements.

Alternatively, if EGR is enabled at 504, the method proceeds to 508 to determine if PCV is enabled. PCV may be enabled when the engine is operating boosted and a PCV valve is open. As discussed above, if PCV is enabled, PCV hydrocarbons (HCs) may be ingested, along with exhaust residuals in the EGR, into the intake aircharge. These hydrocarbons may react with oxygen at the sensing element of the intake oxygen sensor, generating carbon dioxide and water. The resulting lowering of oxygen concentration leads to a misrepresentation of engine dilution and inaccurate EGR flow estimation.

If PCV is enabled, the method continues on to 510 to determine if fuel canister purge is enabled. As discussed above, if fuel canister purge is enabled, a fuel canister purge valve (such as canister purge valve 112 shown in FIG. 2) may be open. If purge is disabled at 510, the method continues on to 514. At 514, the method includes measuring intake oxygen at the intake oxygen sensor and determining an adjusted change in intake oxygen based on a reference point and a previously determined change in intake oxygen due to PCV flow. First, the intake oxygen sensor may measure the intake oxygen. The method at 514 may then include subtracting the intake oxygen measurement (e.g., the output from the intake oxygen sensor) from a reference point. As discussed above, the reference point may be a pre-determined point when the sensor was operating with no EGR (the zero point). Thus, the resulting value may be a total change in intake oxygen (at the intake oxygen sensor) due to diluents in the air flow (e.g., aircharge). In one example, the diluents may be EGR and PCV (e.g., HCs from PCV flow). The method may then include subtracting the change in intake oxygen due to PCV flow, at the corresponding boost level, from the total change in intake oxygen due to diluents (e.g., EGR and PCV) in the air flow. The change in intake oxygen due to PCV flow may be stored in the controller at a corresponding boost pressure. The intake oxygen due to PCV flow may be previously determined during engine operation when EGR and purge were both not enabled, as discussed at FIG. 4. In some examples, the stored change in intake oxygen due to PCV flow may be referred to as a correction factor since the total change in intake oxygen measured at the intake oxygen sensor is being corrected by this value to determine EGR flow.

The resulting value from subtracting the change in intake oxygen resulting from PCV flow from the total change in intake oxygen due to diluents may be the change in intake oxygen due to EGR. More specifically, the resulting value may be the change in intake oxygen due to EGR alone and not due to PCV. In some examples, the change in intake oxygen due to EGR may be further adjusted based on humidity (e.g., ambient humidity measured with a humidity sensor).

Alternatively at 510, if fuel canister purge is enabled, the method proceeds to 512 to measure the intake oxygen at the intake oxygen sensor and determine an adjusted change in intake oxygen based on a reference point, a previously determined change in intake oxygen due to PCV flow, and a change in intake oxygen due to fuel vapor purge (e.g., a purge correction factor). In this way, the method at 512 may follow the method at 514 while additionally correcting the intake oxygen measurement based on a purge correction factor. In alternate embodiments, if purge is enabled, the oxygen sensor may be operated at a higher reference voltage during estimation of EGR to nullify the effect of the purge air. The resulting value at 514 may be the change in intake oxygen due to EGR alone and not due to PCV or purge. In this way, an intake oxygen measurement may be corrected for PCV flow both when purge is enabled and when purge is disabled. However, when purge is enabled, a previously determined correction factor for purge (e.g., change in intake oxygen due to purging of fuel canister) may also be applied to the intake oxygen sensor reading to determine the change in intake oxygen due to EGR.

At 516, the method includes determining (e.g., estimating) EGR based on the adjusted change in intake oxygen measurement. As described above, the adjusted change in intake oxygen measurement may be the change in intake oxygen due to EGR. Further determining EGR may include estimating the EGR flow rate based on the change in intake oxygen due to EGR. Then, at 518, the method may include adjusting an EGR valve based on the determined EGR. For example, if the estimated EGR flow rate is greater than a desired EGR flow rate (based on engine operating conditions), the controller may reduce an opening of the EGR valve to reduce the EGR flow to the desired flow rate. In another example, if the estimated EGR flow is less than the desired EGR flow rate, the controller may increase the opening of the EGR valve to increase the EGR flow rate to the desired flow rate. In some examples, additional engine operating parameters may be adjusted based on the determined EGR flow. For example, spark timing, throttle angle, and/or fuel injection may be adjusted based on the determined EGR flow.

Returning to 508, if PCV is not enabled, the method proceeds to 520 to measure the intake oxygen concentration with the intake oxygen sensor and determine the change in intake oxygen from the reference point. As described above, the method at 520 may include subtracting the intake oxygen measurement from the reference point. The resulting value may be a total change in intake oxygen (at the intake oxygen sensor) due to diluents in the air flow (e.g., aircharge). In this case, since PCV is not enabled, the major or only diluent in the air flow may be EGR. As a result, EGR flow may be estimated from the total change in intake oxygen at 516, as discussed above.

As one embodiment, a method for an engine comprises while exhaust gas recirculation (EGR) is disabled and purge is disabled, estimating PCV flow based on each of a first output of an intake manifold oxygen sensor with boost enabled and a second output of the sensor with boost disabled and during subsequent operation with EGR flowing, adjusting an EGR valve based on a third output of the sensor and the estimated PCV flow. As another embodiment, a method for an engine comprises during operation with EGR flowing, adjusting an EGR valve based on an output of an intake oxygen sensor and PCV flow, the PCV flow identified during previous operation with EGR and purge disabled based on outputs of the intake oxygen sensor with and without boost.

Estimating the PCV flow includes taking a difference between the first output and the second output to determine a first change in intake oxygen resulting from PCV flow. The method further includes adjusting the change in intake oxygen resulting from PCV flow based on humidity. Additionally, the method includes, during operation with EGR flowing, adjusting the third output relative to a reference point to determine a second, total change in intake oxygen due to diluents in intake aircharge. In one example, adjusting the EGR valve based on the third output includes, when PCV is not enabled, adjusting the EGR valve based on the second, total change in intake oxygen due to diluents in the intake aircharge. In another example, adjusting the EGR valve based on the third output includes, when PCV is enabled, adjusting the EGR valve based on a third change in intake oxygen resulting from EGR, the third change in intake oxygen resulting from EGR determined from a difference between the second, total change in intake oxygen due to diluents in the intake aircharge and the first change in intake oxygen resulting from PCV flow.

The method further includes, when the engine is not boosted, first obtaining the second output during non-boosted operation and then obtaining the first output during subsequent boosted operation and when the engine is boosted, first obtaining the first output during boosted operation and then obtaining the second output during subsequent non-boosted operation. In this way, the second output and the first output are obtained during non-boosted and boosted operation, respectively, the switching between non-boosted and boosted operation being in response to engine operating conditions such as torque demand.

In an alternate embodiment, the method may include, when the engine is not boosted, first obtaining the second output during non-boosted operation and then operating the engine boosted, even if boost is not required, and obtaining the first output during boosted operation. Conversely, when the engine is boosted, the method includes first obtaining the first output during boosted operation and then operating the engine non-boosted, if torque demand is below a threshold, and obtaining the second output during non-boosted operation.

The estimated PCV flow is stored as a correction factor, learned as a function of boost pressure, in a memory of a controller of the engine. The controller may continuously update the correction factor when each of EGR and purge is disabled. Additionally, the method includes, if purge is enabled, waiting until a fuel canister purge valve closes and purge is disabled to estimate the PCV flow. Further, the method includes adjusting fuel injection to the engine based on the estimated PCV flow, an amount of fuel injected decreased with increasing estimated PCV flow.

FIG. 6 shows a graphical example of adjustments to an EGR valve and engine fueling based on changes in intake oxygen resulting from PCV flow. Specifically, graph 600 shows changes in actual EGR flow at plot 602, changes in an uncorrected EGR flow at plot 603, changes in desired (e.g., target) EGR flow at plot 604, changes in a position of a fuel canister purge valve at plot 606, changes in PCV flow at plot 608, changes in boost at plot 610, changes in intake oxygen at plot 612, changes in engine fueling at plot 614, and changes in a position of an EGR valve at plot 616. The changes in intake oxygen shown at plot 612 may be measured by an intake oxygen sensor positioned in an intake system of an engine. As discussed above, in one example, the intake oxygen sensor is positioned in an intake manifold, downstream of where EGR flow and PCV flow enter the intake system (e.g., intake manifold oxygen sensor) and upstream of an intake throttle.

Prior to time t1, the EGR valve is closed (plot 616) and EGR is not flowing (EGR is off) into the engine intake passage (plot 602). Additionally, the purge valve is closed (plot 606) and the engine is not boosted (e.g., boost is off) (plot 610). In the present example, a PCV valve in the PCV system may be closed and PCV may not be flowing upstream of the intake sensor (plot 608). In some examples, the PCV valve may be open but during non-boosted conditions, PCV flow may be received directly into the engine intake manifold, downstream of the intake oxygen sensor and therefore the PCV flow may not affect the output of the intake oxygen sensor. Since PCV and EGR are not flowing, there may be less diluents in the intake aircharge (e.g., intake air flow to the intake manifold). Thus, the intake oxygen may be at a first, higher level. Since EGR is not flowing and the purge valve is closed, the controller (e.g., engine controller) may learn a correction factor for the intake oxygen sensor. At time t1, the controller may begin operating the engine boosted and increase boost pressure (plot 610). The boosted operation may be in response to torque demand. As boost increases, PCV flow increases (plot 608). Once the engine is boosted at time t2, the intake oxygen may be measured during boosted operation when PCV is received upstream of the intake oxygen sensor and when the sensor output is affected by the PCV flow. In one example, the engine may take a duration to get to steady boosted conditions wherein PCV flow is flowing at a substantially steady rate. As shown in graph 600, this duration may be between time t1 and time t2. In some examples, when learning the PCV flow correction factor, the controller may wait the duration after turning on boost to obtain the boosted intake oxygen measurement.

Due to PCV flowing, the intake oxygen decreases between time t1 and time t2 to a second, lower level. The decrease, or change, in intake oxygen between time t1 and time t2 is shown at 618. The change in intake oxygen between time t1 and time t2 (shown at 618) is the change in intake oxygen resulting from PCV flow, at the boost level. The controller may store this change in intake oxygen due to PCV flow and the corresponding boost level in the memory of the controller. In one example, the change in intake oxygen due to PCV flow may be referred to as a correction factor and the correction factor may be stored in the memory of the controller in a look-up table for subsequently correcting intake oxygen measurements for EGR flow estimation.

In addition to determining the correction factor, the change in intake oxygen due to PCV flow may be used to estimate PCV flow. Estimating PCV flow may include estimating a PCV flow amount or PCV flow rate. For example, the change in intake oxygen shown at 618 may be converted to equivalent hydrocarbons. The equivalent hydrocarbons may then be used to determine PCV flow. At time t2, the controller may decrease fueling to the engine (e.g., reduce an amount of fuel delivered to the cylinders) based on the estimated PCV flow (plot 614).

After a period of engine operation, at time t3, EGR may be flowing (plot 602). For example, the EGR valve may be opened (plot 616) to allow passage of exhaust gases from the exhaust passage and to the intake passage of the engine. Additionally at time t3, the purge valve may be closed (plot 606), the engine may be boosted (plot 610), and PCV may be flowing into the intake passage (plot 608). In response to EGR flowing while the purge valve is closed, the engine controller may correct the output of the intake oxygen sensor (e.g., the intake oxygen measurement shown at plot 612), based on the previously stored PCV flow correction factor. Specifically, as shown at time t3, the intake oxygen output by the intake oxygen sensor is at a third, lower level (e.g., lower than the first level shown at time t1 and the second level shown at time t2).

In some examples, the first level may be a reference point level of the intake oxygen sensor. In other examples, another, higher intake oxygen may be the reference point level of the intake oxygen sensor. Thus, the total change in intake oxygen relative to the reference point may be shown at 620. The total change in intake oxygen (shown at 620) may be due to both PCV and EGR. The contribution of PCV flow to the total change in intake oxygen (e.g., the change in intake oxygen resulting from PCV flow) is the amount shown at 618. The remaining amount may be the contribution of EGR flow to the total change in intake oxygen (e.g., the change in intake oxygen resulting from EGR flow), as shown at 622. Said another way, the change in intake oxygen due to PCV (shown at 618) plus the change in intake oxygen due to EGR (shown at 622) approximately equals the total change in intake oxygen (shown at 620). Thus, the change in intake oxygen resulting from EGR flow may be an adjusted change in intake oxygen based on the PCV correction factor (e.g., the change in intake oxygen resulting from PCV flow). For example, if no correction factor for PCV flow was used, the controller may determine the total change in intake oxygen (shown at 620) to be from EGR. As a result, the EGR flow rate may be estimated based on this value, as shown by the uncorrected EGR flow estimate (plot 603). Thus, the uncorrected EGR flow rate (plot 603) may be over-estimated from the actual EGR flow rate (plot 602). In response, the controller may reduce the EGR flow rate by a larger amount than actually required.

As shown at time t4, the controller may reduce the opening of the EGR valve (plot 616) since the estimated EGR flow (from the change in intake oxygen adjusted for PCV flow) is slightly higher than the desired (e.g., target) EGR flow rate (plot 604). In one example, the target EGR flow rate may be based on engine speed-load conditions. This reduction in the opening of the EGR valve may be less than the reduction in the opening of the EGR valve if the output of the intake oxygen sensor were not adjusted relative to the PCV correction factor.

As shown between time t1 and time t3 in FIG. 6, a method for an engine may include learning a correction factor for an intake oxygen sensor based on PCV flow and boost conditions. Additionally, as shown at time t4, the method may further include adjusting a position of the EGR valve based on an output of the intake oxygen sensor relative to the correction factor.

As shown at time t2 in FIG. 6, during boosted conditions where EGR and purge are disabled, the method includes flowing blow-by gases from a crankcase to an intake manifold and learning a first output of an intake manifold oxygen sensor. The first output of the intake manifold oxygen sensor may be the second level of intake oxygen shown at time t2. As shown at time t1, during non-boosted conditions where EGR and purge are disabled, the method includes not flowing blow-by gases from the crankcase to the intake manifold and learning a second, different output of the intake manifold oxygen sensor. The second output may be the first level of intake oxygen shown at time t1. Then, the controller may learn an amount of PCV flow to the intake manifold based on a difference between the first and second outputs. During subsequent boosted conditions where EGR is enabled and purge is disabled, as shown at time t3, the method includes learning a third output of an intake manifold oxygen sensor. The third output may be the third level of intake oxygen shown at time t3. The controller may then correct the third output based on the learned amount of PCV flow, estimate EGR flow based on the corrected third output, and adjust an EGR valve opening based on the estimated EGR flow (relative to a target EGR flow, as shown at time t4).

In this way, the output of the intake oxygen sensor may be corrected for PCV flow. As described above, the intake oxygen sensor may be an intake manifold oxygen sensor positioned in the intake manifold of the engine. If the contribution to the change in intake oxygen due to PCV flow is removed from the intake oxygen sensor output, the remaining value may be substantially equivalent to the change in intake oxygen due to EGR flow. This value may then be used to more accurately estimate EGR flow. In this way, a technical effect is achieved by adjusting EGR operation based on the estimated EGR flow, the estimated EGR flow based on a change in intake oxygen resulting from PCV flow. As a result, EGR system control may increase and engine emissions may be maintained at desired levels. Additionally, engine fueling may be adjusted based on the PCV flow estimated by the intake oxygen sensor, improving engine fuel economy and performance.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-3, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a turbocharged internal combustion engine including at least one turbocharger, an intake manifold, an intake oxygen sensor, an EGR valve positioned in an EGR passage, and a fuel system canister, the method comprising:
    positioning the intake oxygen sensor downstream of the at least one turbocharger and upstream of the intake manifold in a flow path of the engine;
    measuring oxygen content in the flow path by the intake oxygen sensor;
    estimating an output of PCV flow;
    operating the engine with and without boost;
    determining the output of the PCV flow with EGR flowing in the EGR passage and purge of the fuel system canister disabled based on at least one output of the intake oxygen sensor during the engine operation;
    directing the output of the PCV flow to a position in a flow path of the engine that is upstream of the intake oxygen sensor which then flows to the intake manifold of the engine during the engine operation with boost;
    directing the output of the PCV flow to a position in a flow path of the engine that is downstream of the intake oxygen sensor which then flows to the intake manifold of the engine during the engine operation without boost; and
    adjusting the EGR valve based on the measured oxygen content by the intake oxygen sensor, the estimated output of the PCV flow, and exhaust gas flowing through the EGR passage.

2. The method of claim 1, wherein the purge being disabled includes a purge valve of the engine coupled between the fuel system canister of the engine and the intake manifold of the engine being closed, and wherein the EGR being disabled includes the EGR valve of the engine in the EGR passage of the engine being closed.

3. The method of claim 1, further comprising learning the output of the PCV flow as a correction factor, the correction factor stored as a function of boost pressure in a look-up table of memory of a controller of the engine.

4. The method of claim 1, further comprising, if the purge is enabled, waiting until a fuel canister purge valve closes and the purge is disabled to estimate the output of the PCV flow.

5. A method for operating a turbocharged internal combustion engine including at least one turbocharger, an intake manifold, an intake oxygen sensor, an EGR valve positioned in an EGR passage, and a fuel system canister, the method comprising:
    positioning the intake oxygen sensor downstream of the at least one turbocharger and upstream of the intake manifold in a flow path of the engine;
    measuring oxygen content in the flow path by the intake oxygen sensor;
    estimating an output of PCV flow;
    operating the engine with and without boost;
    determining the output of the PCV flow with EGR flowing in the EGR passage and purge of the fuel system canister disabled based on at least one output of the intake oxygen sensor during the engine operation;
    directing the output of the PCV flow to a position in a flow path of the engine that is upstream of the intake oxygen sensor which then flows to the intake manifold of the engine during the engine operation with boost;
    directing the output of the PCV flow to a position in a flow path of the engine that is downstream of the intake oxygen sensor which then flows to the intake manifold of the engine during the engine operation without boost;
    adjusting the EGR valve based on the measured oxygen content by the intake oxygen sensor, the estimated output of the PCV flow, and exhaust gas flowing through the EGR passage; and
    adjusting fueling of the engine based on the estimated output of the PCV flow, the engine fueling decreased as the estimated output of the PCV flow increases.

6. The method of claim 5, further comprising estimating the output of the PCV flow at a first frequency, the first frequency based on a threshold number of engine starts, and further comprising increasing the first frequency to a higher, second frequency in response to an increase in the estimated output of the PCV flow over a threshold and maintaining the estimated output of the PCV flow at the second frequency until the estimated output of the PCV flow decreases below the threshold, the second frequency increasing with an increasing magnitude of the estimated output of the PCV flow.

7. The method of claim 5, further comprising learning a change in intake oxygen as a function of boost pressure during the boosted operation of the engine.

8. The method of claim 7, further comprising, during subsequent operation of the engine with EGR enabled and purging disabled, estimating an EGR flow rate based on an output of the at least one output of the intake oxygen sensor, a correction factor based on the learned change in intake oxygen, and an intake oxygen sensor reference point.

9. The method of claim 8, further comprising adjusting an EGR valve of the engine based on the estimated EGR flow rate relative to a target EGR flow rate, the target EGR flow rate based on engine speed-load conditions.

10. An engine system, comprising:
an engine including an intake manifold;
a crankcase coupled to the intake manifold via a PCV valve;
a turbocharger with an intake compressor, an exhaust turbine, and a charge air cooler;
an intake throttle coupled to the intake manifold downstream of the charge air cooler;
a canister configured to receive fuel vapors from a fuel tank, the canister coupled to the intake manifold via a purge valve;
an EGR system including a passage for recirculating exhaust residuals from downstream of the turbine to upstream of the compressor and through the engine via an EGR valve;
an oxygen sensor coupled to the intake manifold, downstream of the charge air cooler and upstream of the intake throttle; and
a controller with computer readable instructions for:
learning a correction factor for an intake oxygen sensor based on PCV flow and boost conditions of the engine; and
adjusting a position of the EGR valve based on an output of the intake oxygen sensor relative to the correction factor.

11. The system of claim 10, wherein learning the correction factor includes determining a change in intake oxygen at the intake oxygen sensor between boosted and non-boosted engine operation when the EGR valve and the purge valve are both closed.

12. The system of claim 11, wherein the computer readable instructions further include instructions for estimating an EGR flow rate based on a change in intake oxygen of the engine due to EGR, the change in intake oxygen of the engine due to EGR determined from subtracting the correction factor from the output of the intake oxygen sensor.

* * * * *